May 16, 1933.  W. FOURNESS  1,909,577
REFRIGERATOR PAN
Filed Oct. 20, 1930
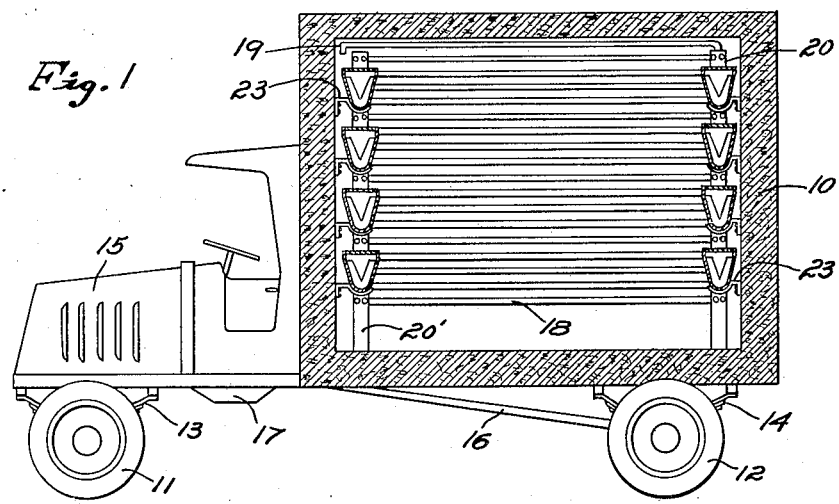
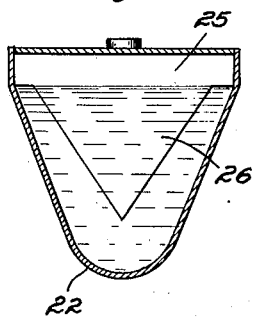
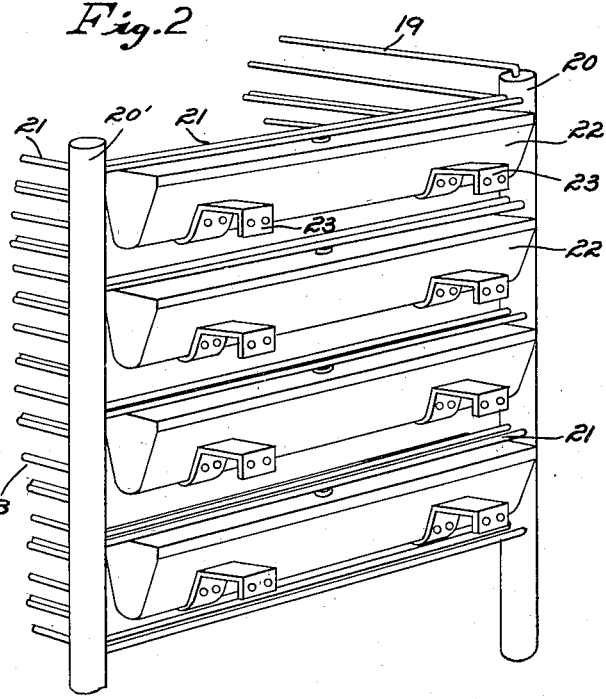
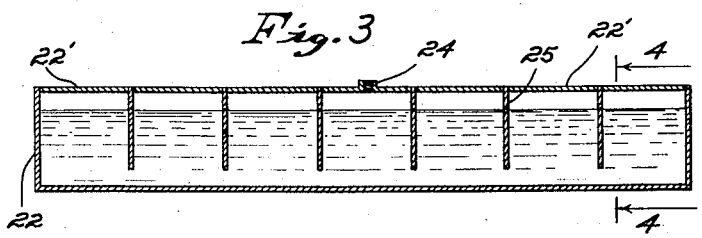
Inventor
Wilfred Fourness
John Flam
Attorney Patented May 16, 1933

1,909,577

UNITED STATES PATENT OFFICE

WILFRED FOURNESS, OF OAKLAND, CALIFORNIA, ASSIGNOR TO FOURNESS DEVELOPMENT CORPORATION LTD., OF NEW YORK, N. Y., A CORPORATION OF NEW YORK

REFRIGERATOR PAN

Application filed October 20, 1930. Serial No. 489,908.

This invention relates to refrigeration; and especially to a device providing a frozen medium that can be used to supplement a main mechanical refrigerating system, or that can be used much as ice is used. For example, I may provide a pan in which brine is placed, and arranged to continue a refrigerating effect after shut down, or during repairs. Such a container for brine can be used in any desired way in general mechanical refrigerating systems; and is useful for example in portable refrigerating systems.

In such portable mechanical refrigerating systems for conveying food products, such as frozen confections or other perishable articles, the system is usually operated by the motive power for the vehicle which transports the articles; and the container provides a means for maintaining a refrigerating temperature within the body of a truck during periods when the refrigerating system therein is inactive due to the inactivity of the motor or other motive power.

Portable refrigerating trucks are now known, and are used to transport food products or other perishable articles. A refrigerating system is maintained within the truck body, and is operated from a source of power such as a motor or transmission mechanism. Such trucks are open to many objections, the most outstanding of which is the failure or lack of means for providing or maintaining a continued refrigerating temperature within the truck body during the periods of inactivity of the motor, which is usually due to the break-downs thereof and more generally to what is termed the layover period; that is, the night time when the truck is stored.

In the refrigerating trucks of the prior art, it is necessary to remove the food products from the truck during this lay-over period, as the proper refrigerating temperature would soon be exceeded and thus deleteriously affects the food products therein. I have provided a means to overcome this above mentioned objection by providing a means for maintaining the refrigerating temperature within the truck body constant and continuous during the lay-over period and therefore obviates the necessity of removing the food products from the truck during this period. I accomplish this by providing a plurality of hermetically sealed containers which are filled with a liquid refrigerant such as brine. The refrigerant within these containers is frozen, in the course of time, into solid form by means of the refrigerating system within the truck. During the periods of inactivity of the motor, that is, when the operation of the motor ceases, the refrigerating effect of the system within the truck likewise ceases, and the temperature therein is maintained constant by means of the solidified liquid refrigerant, which can absorb heat in the process of melting.

It is an object of this invention to provide a means for improving the refrigerating trucks of the prior art.

It is a further object of this invention to provide a refrigerating truck having a plurality of advantageously spaced containers filled with brine which acts to maintain a constant temperature in the refrigerating compartment when the compressor mechanism is not operating, as for instance over night.

It is a further object of this invention to provide containers filled with refrigerant which may be readily removed for repairs or replacement without disturbing the coils of the refrigerating system therein.

It is a further object of this invention to provide a container which is adapted to be almost completely filled with a liquid refrigerant, and which is divided into a plurality of longitudinal compartments or spaces by means of partitions such as tapered fins which extend from the top of the container to a point near the bottom thereof. In this manner the plurality of spaces above the brine in which air is trapped, prevents a large body of liquid from shifting from one side to the other in case the containers are maintained in an angular position due to road conditions.

It is a further object of this invention to provide partitions or tapered fins which extend almost to the bottom of the container and thereby prevent or hold the frozen refrigerant from shifting about within the container.

It is a further object of this invention to provide a container simple in design and construction and which may be readily incorporated with a refrigerating system on a truck.

It is a further object of this invention to provide fins within a hermetically sealed container which act on a frozen body therein to pin it in place.

It is a further object of this invention to provide tapered fins within a hermetically sealed container which divide the container into a plurality of intercommunicating compartments. By means of this arrangement, a liquid poured into the container will seek its own level and provide a plurality of equal spaces in each compartment between the surface of the liquid and the top of the container. Thus the liquid in each compartment, when frozen, will have space in which to expand and therefore insure against bulging or spreading of the container due to the expansion of the liquid while freezing.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is a side elevation mainly diagrammatic of a refrigerating truck embodying this invention, the body portion of which is shown in longitudinal section for the purpose of illustration;

Fig. 2 is a detailed perspective view of a portion of my refrigerating system showing the relation of the container with the coils of the refrigerator;

Fig. 3 is a longitudinal section of a container embodying this invention; and

Fig. 4 is a transverse section thereof taken substantially along the plane 4—4 of Fig. 3.

The main vehicle body which is indicated by the numeral 10, is mounted upon a chassis of the usual type, and is supported above the ground by the wheels 11, 12 and the springs 13, 14. The vehicle body is driven by a motor beneath the hood 15 through the medium of a driving or propelling shaft 16 connected in a suitable manner to the transmission 17 and the rear axle, to which the wheels 12 are secured.

The main vehicle body 10 forms a storage space for the food products, frozen confections, or other perishables, and in addition houses a mechanical refrigerating system which is operated by the motor. The compressor mechanism of this system is not shown, but it is to be understood that any suitable compressor mechanism may be utilized, and positioned in any desirable place within the main body. Such a refrigerating system should preferably be of the circulatory type, the compressing mechanism of which cyclically causes the refrigerant to be compressed, then condensed, and finally expanded in the refrigerating coils.

These coils, referred to as a whole as by 18, comprise an inlet conduit 19 which leads from the condenser of the compressor mechanism (not shown) to an inlet header 20 of the coils 18. Headers 20' similar to header 20 are provided in each of the four corners of the interior of the main body 10 and permit the flow of refrigerant therethrough through the medium of the coils or conduits 21. It will be noted from Fig. 2 that the coils or pipes between the headers 20 which extend transversely of the main body 10, are spaced wider apart than the pipes which extend between the headers longitudinally of the main body. In this manner sufficient space is provided between the pipes, to permit the insertion of refrigerating tanks 22 adjacent the end walls of the main body.

It will be understood that the walls of the main body 10 are constructed in such a manner as to aid in the insulation of the interior or storage space. Thus, the walls may be formed of cork, or of spaced boards filled with a suitable insulating material, such as granulated cork or cotton bagasse, and in this instance they are shown as formed of cork. These walls are constructed of sufficient rigidity to support and withstand the load of the tanks 22. This is accomplished by means of brackets 23 which are secured in any desirable manner, as by rivets, to the end walls of the main body 10, and which extend under and support the containers 22.

The containers 22 are substantially triangular in shape and are made of some suitable non-rusting material, such as 16 gauge Monel metal. Any strong strain resisting and rust proof material may be used for these containers. The containers are fully closed and are provided with removable filler plugs 24 in the top thereof in order to provide a means for pouring liquid refrigerant therein, such as brine. The containers are substantially entirely filled with the brine, and preferably are filled to about 1½ inches from the top thereof in order to provide an air space. As the brine may be concentrated at one end of these containers, and be frozen in that position due to the condition of the roads, the frozen brine would tend to rupture or break the tank due to the lack of air space above the frozen brine at the end of the tank in which the brine is concentrated. I obviate this possibility by providing a means which assures an air space above the level of the frozen refrigerant within the container and thus provide a means for permitting the expansion of the refrigerant, without deleteriously affecting the container.

I accomplish this by dividing the space above the brine into a series of longitudinal spaces by means of partitions 25 which extend approximately 1½ inches from the top of the container and then taper, as a fin, to a point spaced from the bottom thereof. The upper portions of these partitions are first welded to the inner sides of the container, and the top portions 22′ then welded in place, as is clearly apparent from Fig. 3. In this manner, the spaces between the top of the liquid level and the top of the container are hermetically sealed from each other. Now, if the brine is frozen, only a small body of liquid is shifted from one end to the other due to the condition of the road, and accordingly, an air space is provided above the level of the frozen brine within each compartment by means of the partitions 25. The tapered fins, referred to as by 26, extend almost to the bottom of the container 22 and tend to hold the frozen refrigerant from shifting about while the truck is in transit. It is quite apparent that these containers may be readily removed for repair or replacement without affecting or disturbing the coils or pipes 21 or the headers 20.

As has been heretofore mentioned, any suitable liquid refrigerant may be used, although preferably I employ a brine solution which freezes at approximately 0° F.

The operation of this refrigerating system is now readily apparent. The condensed refrigerant from the container of the compressor mechanism (not shown) is forced into the inlet conduit 19 and into the header 20. This header is now filled with refrigerant from the inlet conduit 19 and acts as a source for distribution of the refrigerant to the spaced coils 21. The refrigerant is forced throughout all the convolutions of the coils within the main body 10 and finally into an outlet conduit (not shown) from one of the headers 20′, and into the compressor of the refrigerating system, where the operation above described is continuously repeated.

The pumping of the condensed refrigerant through the coils 21 and the headers 20 and 20′ causes a lowering of the temperature within the main body 10 due to the expansion of the refrigerant within the coils and headers. At the same time the refrigerant within the coils and headers acts on the containers 22 and causes a freezing of the liquid refrigerant therein. It is clearly apparent from Figs. 1 and 2 that the containers having cooling coils adjacent the top and bottom thereof, and thus assure the thorough freezing of the solution therein.

The brine in containers 22 may take a substantial time to freeze; but since the truck is usually operated over long uninterrupted periods, this freezing is accomplished soon enough to provide a "cold reservoir" during lay-off intervals.

If for any reason the refrigerating system is inactive, as for instance a break down, or in case it is desired to keep the truck over night in a garage, the frozen refrigerant within the containers 22 acts to maintain the refrigerating temperature within the main body 10 for a considerable length of time. In this manner it is possible to keep food products or other perishables within the main body during a lay-over period without fear of their being damaged by temperature conditions.

Although I have described my container in combination with a portable refrigerating truck, my invention is not to be construed as limited thereto as it may very advantageously be used in other places. Thus in refrigerating plants or storage boxes, this container with its enclosed refrigerant is maintained therein until frozen and may then be used in secondary boxes in place of ice. It is to be understood that this invention embodies all uses to which a container such as that hereinabove described may be put to.

I claim:

1. In combination with a motor vehicle, a body, a refrigerating system within the body normally operating to maintain a refrigerating temperature therein, said refrigerating system comprising a plurality of spaced coils positioned adjacent the inner walls of the body, and means acting to continue the maintenance of the refrigerating temperature while said refrigerating means is inactive, said means comprising a plurality of containers, containing a refrigerant, which are positioned between the coils.

2. In combination with a motor vehicle, a body, a refrigerating system within the body normally operating to maintain a refrigerating temperature therein, said refrigerating system comprising a plurality of spaced coils positioned adjacent the inner walls of the body, and means acting to continue the maintenance of the refrigerating temperature while said refrigerating means is inactive, said means comprising a plurality of containers, containing a refrigerant, which are positioned between the coils adjacent the ends of the body.

3. In combination with a motor vehicle, a body, a refrigerating system within the body comprising a plurality of spaced coils positioned adjacent the inner walls thereof, containers, containing a liquid refrigerant, positioned between the convolutions of the coils, said refrigerating system normally operating to maintain a refrigerating temperature within the body, and at the same time solidifying the refrigerant within the containers, said solidified refrigerant acting to continue the refrigerating temperature while said refrigerating system is inactive.

4. In combination with a motor vehicle, a body, a refrigerating system within the body, comprising a plurality of spaced coils positioned adjacent the inner walls thereof, containers, containing a liquid refrigerant, positioned between the coils, adjacent the ends of the body, said refrigerating system normally operating to maintain a refrigerating temperature within the body, and at the same time solidifying the refrigerant within the containers, said solidified refrigerant acting to continue the refrigerating temperature while said refrigerating system is inactive.

5. In combination with a refrigerating truck, a container substantially entirely filled with a liquid, said container comprising an elongated hermetically sealed vessel having a substantially triangular shape and a plurality of partitions dividing the interior of the vessel into compartments, said partitions, at the upper portions thereof, being joined to the side walls and top of the vessel.

6. In combination with a refrigerating truck, a container substantially entirely filled with a liquid, said container comprising an elongated vessel having a substantially triangular shape, and a plurality of partitions dividing the interior of the vessel into compartments, said partitions, at the upper portions thereof being secured to the sides of the vessel, and the lower portions thereof being spaced from the bottom of the vessel whereby communication between the compartments is maintained only at the bottom.

7. In combination with a refrigerating truck, a container substantially entirely filled with a liquid, said container comprising an elongated vessel having a substantially triangular shape, and a plurality of partitions dividing the interior of the vessel into compartments, said partitions, at the upper portions thereof being secured to the sides of the vessel, and the lower portions thereof having a contour substantially similar to the side walls of the vessel, and the bottom of the lower portion being spaced from the bottom of the vessel whereby a continuous passageway between the compartments is maintained only along the bottom of the vessel.

8. In combination with a refrigerating truck, a container substantially entirely filled with a liquid, said container comprising an elongated vessel having a substantially triangular shape, and a plurality of partitions dividing the interior of the vessel into compartments, said partitions, at the upper portions thereof being secured to the sides of the vessel, and the lower portions thereof having a contour substantially similar to the side walls of the vessel and spaced therefrom, and the bottom of the lower portion being spaced from the bottom of the vessel whereby a continuous passageway between the compartments is maintained only along the bottom of the vessel and the spaces between the lower portion of the partitions and the side walls of the vessel.

9. In combination with a motor vehicle, a body, a refrigerating system therein normally operating to maintain a refrigerating temperature within the body, said refrigerating system comprising a plurality of spaced coils positioned adjacent the inner walls of the body, and means acting to continue the maintenance of the refrigerating temperature while said refrigerating means is inactive, said means comprising a plurality of containers which are positioned adjacent the coils, each container having a substantially triangular shape, a plurality of partitions dividing the interior of the container into compartments, said partitions, at the upper portion thereof being joined to the side walls and top of the container, and the lower portions thereof having a contour substantially similar to the side walls of the container and spaced therefrom, and the bottom of the container, whereby a continuous passageway is maintained only along the bottom portion of the partitions and the side walls of the container.

10. The combination set out in claim 9 in which the containers are positioned between the coils adjacent the end walls of the body.

11. A container substantially entirely filled with a liquid, said container comprising an elongated vessel having a substantially triangular shape and a plurality of partitions dividing the interior of the vessel into compartments, said partitions, at the upper portions thereof, being joined to the side walls and top of the vessel.

12. A container substantially entirely filled with a liquid, said container comprising an elongated vessel having a substantially triangular shape, and a plurality of partitions dividing the interior of the vessel into compartments, said partitions, at the upper portions thereof being secured to the sides of the vessel, and the lower portions thereof being spaced from the bottom of the vessel whereby communication between the compartments is maintained only at the bottom.

13. A container substantially entirely filled with a liquid, said container comprising an elongated vessel having a substantially triangular shape, and a plurality of partitions dividing the interior of the vessel into compartments, said partitions, at the upper portions thereof being secured to the sides of the vessel, and the lower portions thereof having a contour substantially similar to the side walls of the vessel, and the bottom of the lower portion being spaced from the bottom of the vessel whereby a continuous passageway between the compartments is maintained only along the bottom of the vessel.

14. A container substantially entirely filled with a liquid, said container comprising an elongated vessel having a substantially triangular shape, and a plurality of partitions dividing the interior of the vessel into compartments, said partitions, at the upper portions thereof being secured to the sides of the vessel, and the lower portions thereof having a contour substantially similar to the side walls of the vessel and spaced therefrom, and the bottom of the lower portion being spaced from the bottom of the vessel whereby a continuous passageway between the compartments is maintained only along the bottom of the vessel and the spaces between the lower portion of the partitions and the side walls of the vessel.

In testimony whereof, I have subscribed my name.

WILFRED FOURNESS.